United States Patent
Lipps

(10) Patent No.: US 6,609,047 B1
(45) Date of Patent: *Aug. 19, 2003

(54) METHODS AND APPARATUS FOR DISPENSING ITEMS

(75) Inventor: Randall A. Lipps, Menlo Park, CA (US)

(73) Assignee: Omnicell Technologies, Inc., Palo Alto, CA (US)

(*) Notice: Subject to any disclaimer, the term of this patent is extended or adjusted under 35 U.S.C. 154(b) by 41 days.

This patent is subject to a terminal disclaimer.

(21) Appl. No.: 09/670,427

(22) Filed: Sep. 26, 2000

Related U.S. Application Data

(63) Continuation of application No. 08/250,223, filed on May 27, 1994, now Pat. No. 6,272,394, which is a continuation-in-part of application No. 08/095,619, filed on Jul. 21, 1993, now abandoned.

(51) Int. Cl.[7] .............................................. G06F 17/00
(52) U.S. Cl. .......................................... 700/231; 221/2
(58) Field of Search ............................... 700/231, 244; 221/2

(56) References Cited

U.S. PATENT DOCUMENTS 3,556,342 A    1/1971   Guarr (List continued on next page.)

*Primary Examiner*—John Follansbee
*Assistant Examiner*—Edward F. Gain, Jr.
(74) *Attorney, Agent, or Firm*—Townsend and Townsend and Crew LLP

(57) ABSTRACT

The invention provides methods and apparatus for dispensing items from a dispensing unit. According to the invention, the dispensing unit comprises a plurality of locations in which the items are held, a processor in which records corresponding to the items on the unit are stored, and a plurality of item switches corresponding to the locations in which the items are held. The item switches are connected to the processor so that a user of the dispensing unit can input records of items removed from the unit into the processor. The apparatus described is particularly suited for dispensing medical supplies although the apparatus will be usable for other types of items as well. Preferred embodiments will include a plurality of visual indicators, typically in the form of light emitting diodes, corresponding to the locations in which the items are held. Upon selection of a desired item from a list of items held by the unit, the visual indicator corresponding to the item is actuated so that the user can locate the desired item quickly and conveniently with the help of the visual indicator.

6 Claims, 16 Drawing Sheets

U.S. PATENT DOCUMENTS

| | | |
|---|---|---|
| 3,917,045 A | 11/1975 | Williams et al. |
| 4,019,793 A | 4/1977 | Gerding |
| 4,021,644 A | 5/1977 | Dreslinski |
| 4,267,942 A | 5/1981 | Wick, Jr. et al. |
| 4,360,125 A | 11/1982 | Martindale et al. |
| 4,473,884 A | 9/1984 | Behl |
| 4,635,053 A | 1/1987 | Banks et al. |
| 4,639,875 A | 1/1987 | Abraham et al. |
| 4,695,954 A | 9/1987 | Rose et al. |
| 4,737,910 A | 4/1988 | Kimbrow |
| 4,783,740 A | 11/1988 | Ishizawa et al. |
| 4,785,969 A | 11/1988 | McLaughlin |
| 4,811,764 A | 3/1989 | McLaughlin |
| 4,847,764 A | 7/1989 | Halvorson |
| 4,942,275 A | 7/1990 | Addy et al. |
| 4,962,491 A | 10/1990 | Schaeffer |
| 4,967,928 A | 11/1990 | Carter |
| 5,014,875 A | 5/1991 | McLaughlin et al. |
| 5,047,948 A | 9/1991 | Turner |
| 5,055,660 A | 10/1991 | Bertagna et al. |
| 5,069,511 A | 12/1991 | Swets et al. |
| 5,088,056 A | 2/1992 | McIntosh et al. |
| 5,097,982 A | 3/1992 | Kedem et al. |
| 5,150,817 A | 9/1992 | Livingston |
| 5,176,285 A | 1/1993 | Shaw |
| 5,221,024 A | 6/1993 | Campbell |
| 5,259,668 A | 11/1993 | Teufel et al. |
| 5,263,596 A | 11/1993 | Williams |
| 5,267,174 A | 11/1993 | Kaufman et al. |
| 5,292,029 A | 3/1994 | Pearson |
| 5,314,243 A | 5/1994 | McDonald et al. |
| 5,337,919 A | 8/1994 | Spaulding et al. |
| 5,346,297 A | 9/1994 | Colson, Jr. et al. |
| 5,408,443 A | 4/1995 | Weinberger |
| 5,805,455 A | 9/1998 | Lipps |
| 6,272,394 B1 * | 8/2001 | Lipps .................. 700/231 |
| 6,385,505 B1 * | 5/2002 | Lipps .................. 221/2 |

* cited by examiner

METHODS AND APPARATUS FOR DISPENSING ITEMS

CROSS REFERENCE TO RELATED APPLICATIONS

This application is a continuation of and claims the benefit of U.S. application Ser. No. 08/250,223, filed May 27, 1994. Now U.S. Pat. No. 6,272,394 which is a CIP of U.S. application Ser. No. 08/095,619, filed Jul. 21, 1993, abandoned, the disclosures of which are incorporated by reference.

BACKGROUND OF THE INVENTION

1. Field of the Invention

The invention relates to methods and apparatus for the controlled dispensation and inventorying of items. The invention, which may find particular use in dispensing medical supplies, provides for quick and convenient access to the items, while providing a means for keeping accurate and up-to-date information on the number and type of items dispensed.

2. Description of the Background Art

In medical facilities, large numbers of different medical supply items are stored in supply rooms or on prestocked carts for nurses to access as needed. Inventories of medical supplies used for individual patients are frequently recorded after the particular supply has been taken from the storage unit or area, with such inventories being updated periodically during the day. This results in incomplete and/or inaccurate billing of supplies to patients and requires nurses to dedicate part of their shift hours to inventory control.

A variety of dispensing systems has been used to control access to medical supplies and while providing fully stocked storage areas either in centralized or remote areas of the medical facility. In one such system, referred to as a "cart exchange" system, dispensing carts at remote dispensing stations are periodically exchanged with fully supplied carts. The "used" cart is returned to a central supply area where inventory decreases of particular medical supplies are recorded and the cart is restocked to predetermined "par" levels. These par levels are intended to ensure constant availability of required medical supplies.

In a similar system, the individual carts are not removed from their remote locations in the medical facility. Instead, a large cart holding a variety of medical supplies is circulated throughout the facility to restock individual carts to their par levels.

In either system, the restocking period may be as long as twenty-four hours due to limitations on the hospital staff. This leads to inefficient stocking and inaccurate billing because inventorying of consumed supplies is done relatively long after the supplies are taken from the carts. In view of the deficiencies in existing dispensing systems, it would be advantageous to provide improved methods and apparatus for dispensing items in general and medical supplies in particular. It would be particularly advantageous if the improvements provided for controlled-access to the supplies, with convenient and accurate real-time recording of inventory information.

SUMMARY OF THE INVENTION

The invention provides methods and apparatus for dispensing items from a dispensing unit. According to the invention, the dispensing unit comprises a plurality of locations in which the items are held, a processor in which records corresponding to the items on the unit are stored, and a plurality of item switches corresponding to the locations in which the items are held. The item switches are connected to the processor so that a user of the dispensing unit can input records of items removed from the unit into the processor. The apparatus described is particularly suited for dispensing medical supplies although the apparatus will be usable for other types of items as well, including medical equipment and pharmaceuticals.

In preferred embodiments, the unit includes a display panel connected to the processor to display information for a user of the unit. The display panel may conveniently include a touch sensitive screen through which the user may enter information into the processor.

In the preferred embodiment described below, the items are held in a plurality of compartments located on shelves within cabinets on the unit. The shelves themselves are movable and the compartments are defined by movable dividers so that the heights and widths of the compartments can be modified to accommodate items of varying size.

Preferred embodiments will include a plurality of visual indicators, typically in the form of light emitting diodes, corresponding to the locations in which the items are held. Upon selection of a desired item from a list of items held by the unit, the visual indicator corresponding to the item is actuated so that the user can locate the desired item quickly and conveniently with the help of the visual indicator.

In the embodiment described, the processor is capable of storing information regarding what items are held by the unit and in what quantity. The processor may also include information identifying patients located in the vicinity of the dispensing unit and elsewhere in the medical facility in which the unit is used. This information is updated continuously as items are removed from the unit and records are kept to indicate for which patients the items were removed. The information stored in the processor can be transferred over telephone lines to and from central record keeping facilities located elsewhere in the hospital.

In another embodiment, a method for dispensing items from a dispensing unit having at least two latchable doors is provided to allow heightened security for the inventory of items held in the dispensing unit. The method includes inputting patient identification information into the dispensing unit to unlatch all door. A door is then selected and opened, and an item is removed from the dispensing unit. Once the door is opened, all other doors latch. After the item is removed, the door is closed. If item identification information was not input into the dispensing unit before the door was closed, all door become latched. If item identification information was input into the dispensing unit before the door was closed, all doors become unlatched to allow another door to be selected and opened.

In another embodiment, a method for dispensing items from a dispensing unit having a latchable door is provided. The door is latched until both patient identification information and item identification information are input into the dispensing unit. The input of this information unlatches the door allowing the identified item to be removed from the dispensing unit.

A further embodiment provides a method for dispensing items from a dispensing unit holding the items by operating an input device on the dispensing unit which is in close proximity to a location where a desired item is held. The desired item is not available for removal until the input device is operated thereby producing a record of the desired item's removal. In one aspect of this embodiment, the desired item is made available for removal by the unlocking of a door corresponding to the location where the desired item is held after the input device is operated. If the location of an entry is unknown, the operator can select an entry corresponding to the desired item from a list of entries which then actuates an indicator in close proximity to the location where the desired item is held. In a further aspect, the operator must enter patient identification information and/or an operator identifier into the dispensing unit prior to operating the input device.

Another embodiment of the dispensing unit of the present invention comprises an enclosure with an interior accessible through a doorway and a plurality of storage locations within the interior of the enclosure. An input device in close proximity and associated with each storage location is provided along with means across the doorway for selectively blocking access to the storage locations while permitting access to the input devices at all times. Means for opening the blocking means are also provided to permit access to a desired storage location selected from the plurality of storage locations in response to actuation of the corresponding input device. The blocking means can be a transparent door having a plurality of openings to permit access to the input devices or it can be a plurality of transparent doors which are vertically spaced-apart from each other to define horizontal gaps which are aligned with the input devices. The opening means can be a controller configured to release a latch allowing the door to open after patient identification and item identification information have been entered. The storage locations can be located on a plurality of shelves which are subdivided into a plurality of compartments by dividers between the compartments. Further, at least some of the shelves can be movable to adjust the heights of the compartments, and at least some of the dividers can be movable to adjust the widths of the compartments.

DESCRIPTION OF SPECIFIC EMBODIMENTS

Figure 1:
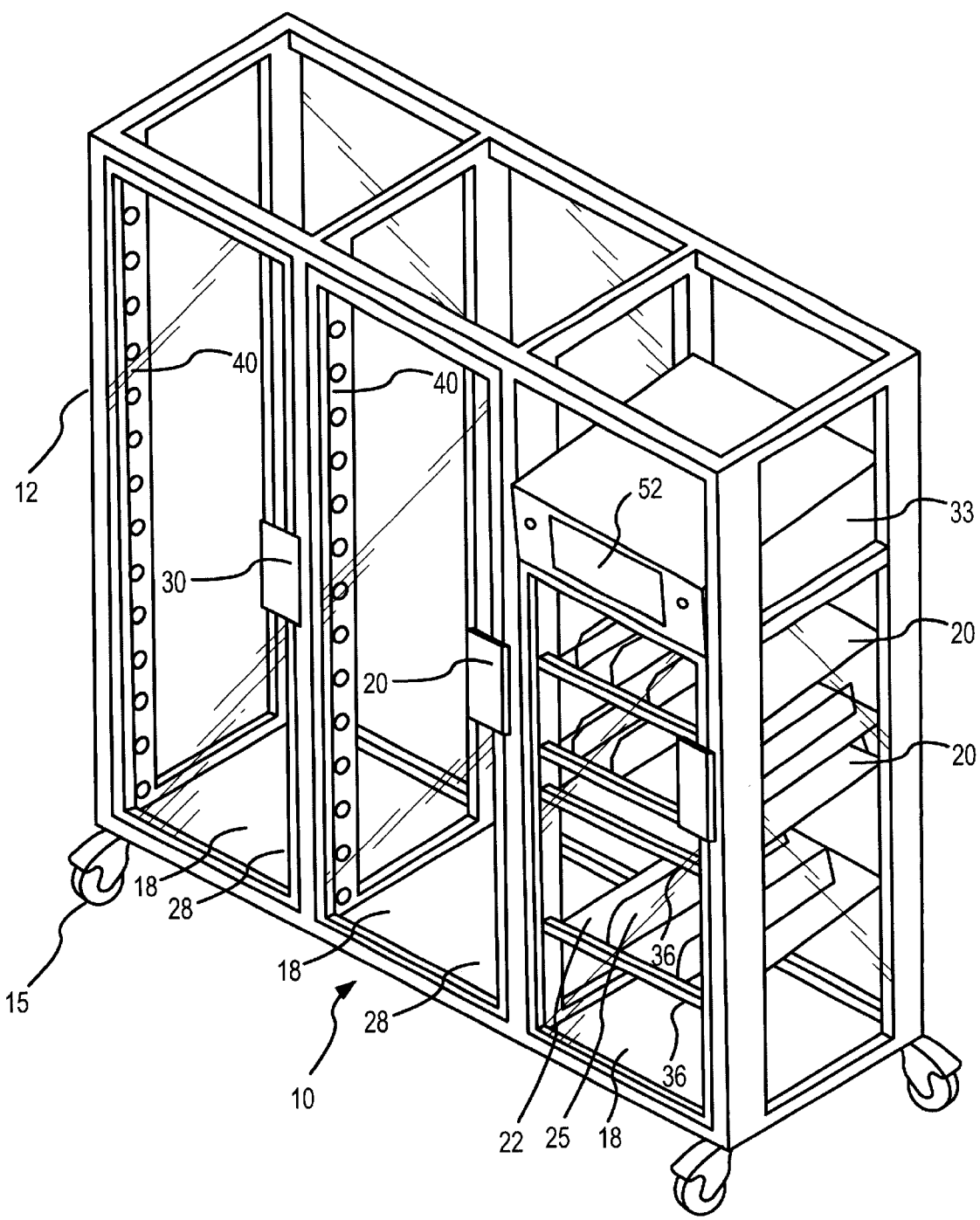
FIG. 1 depicts a dispensing unit according to the present invention.

Apparatus suitable for practicing the methods of the present invention may take the form depicted in FIG. 1. As shown therein, a dispensing unit 10 comprises a cabinet 12 rollable on wheels or casters 15. Cabinet 12 is divided into several (usually three to five) vertical columns 18. The columns 18 are divided by a number of shelves 20. Each shelf 20 may be subdivided into a number of individual compartments 22 by vertical dividers 25 inserted above the shelves. The shelves 20 and dividers 25 are individually movable (or removable) so that the height and width of the compartments 22 can be changed as desired to accommodate a variety of items of varying size. Although the dispensing unit is intended especially for dispensing medical supplies, similar apparatus may also prove useful for dispensing other types of items as well, including medical equipment and pharmaceuticals.

Each of the columns 18 is housed behind a door 28, openable by means of a handle 30. Electronically controlled locks behind door handles 30 control access to the items housed in the cabinets in response to commands sent from a processor 33. Operation of the processor unit will be described in detail below. Doors 28, as well as the sides and tops of the cabinets, will usually be made of transparent material so that the items housed in the cabinets are easily visible. Panels made of transparent Lexan® plastic are tough, fairly lightweight and reasonably inexpensive.

The number of shelves 20 and the vertical spacings between the shelves can be varied by inserting or removing individual shelves in columns 18 of cabinet 12. In front of each shelf 20, a switch panel 36 is inserted into ports 38 in the vertical members 40 of cabinet 12. The top of each switch panel 36 rises above the shelf so that the switch panels help to hold the stocked items in their individual storage compartments 22.

Figure 2A:
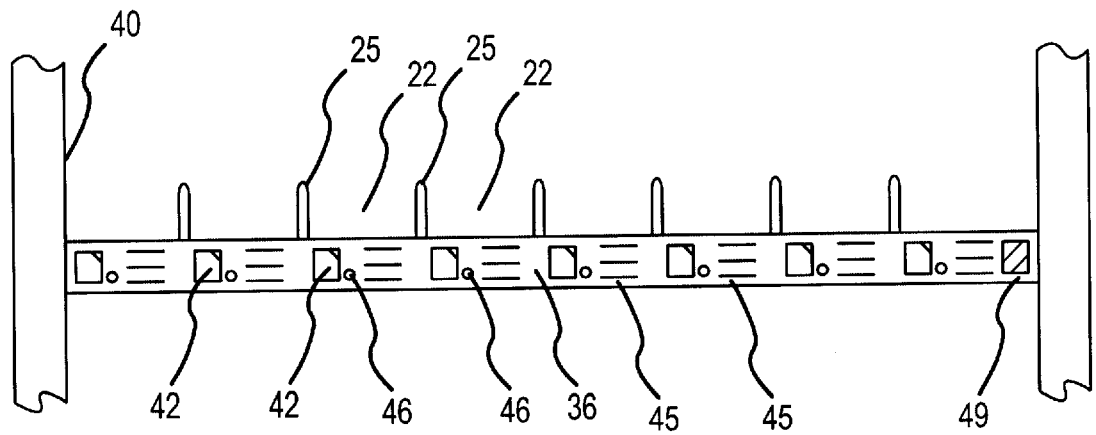
FIGS. 2A and 2B provide a front view of a switch panel at the front of a shelf on which compartments for holding items are defined by a plurality of movable dividers.
Figure 2B:
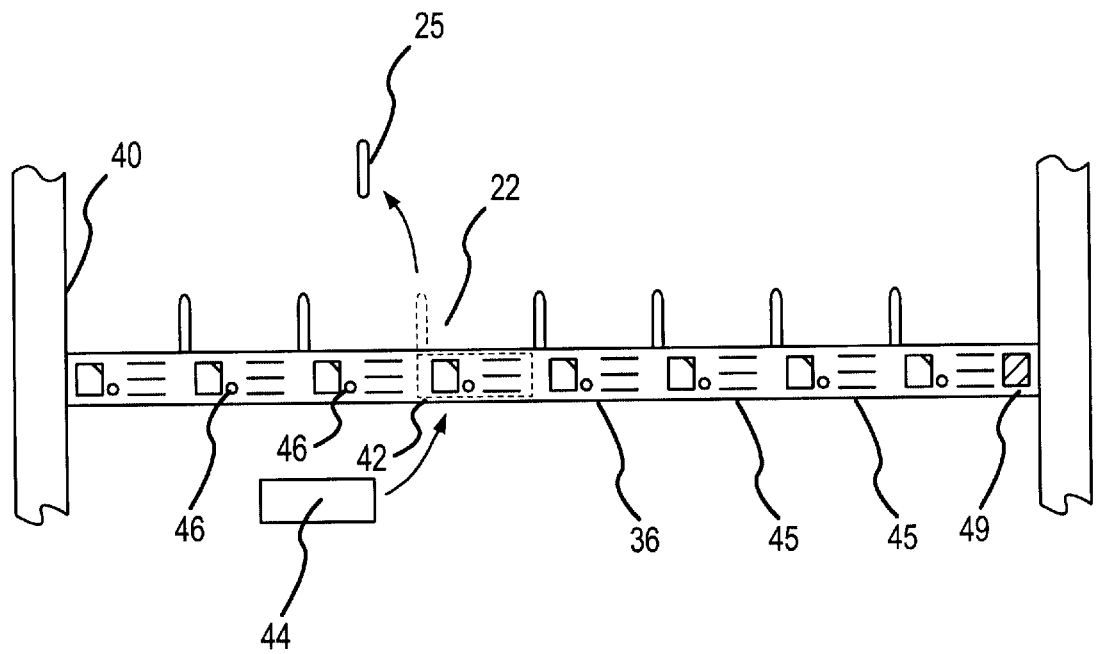

FIGS. 2A and 2B depict one switch panel 36, located at the front of a shelf (not shown), as well as a plurality of removable dividers 25, which define a number of compartments 22 across the width of the shelf. The height of the compartments is defined by the spacing between adjacent shelves as described above. The number and widths of the compartments are defined by inserting or removing dividers 25 as depicted in FIGS. 2A and 2B. FIG. 2A depicts a shelf for which dividers 25 have been inserted to define a compartment 22 corresponding to each one of a number of individual touch-activated item switches 42 on the front of switch panel 36.

If one or more wider compartments are desired to accommodate larger items, then one or more of the dividers 25 may be removed from the shelf as depicted in FIG. 2B. An opaque cover 44 is then snapped into place over a corresponding one of the item switches 42 on switch panel 36. In this way, compartments of various widths may be provided with one exposed item switch 42 associated with each individual compartment 22. The positioning of the item switches 42 relative to the dividers 25 is such that, no matter the width of the compartment, the one exposed item switch corresponding to the compartment is below and near one end (the left end in FIG. 2B) of the compartment. Identifying information such as the item name or item number may be written onto labels 45 on the switch panel 36 in close proximity to the item switches 42.

Touch-activated item switches 42 are used to gather inventory information as items are taken from and restocked into the compartments. Additionally, each item switch 42 has a visual indicator 46 located near it. Visual indicators 46 may be in the form of small light sources, preferably light emitting diodes (LEDs). Finally, each switch panel 36 includes a touch-activated cancel switch 49 near one end (the right end in FIGS. 2A and 2B) of the switch panel. The operation of the switches and visual indicators will be described in more detail below.

Figure 3:
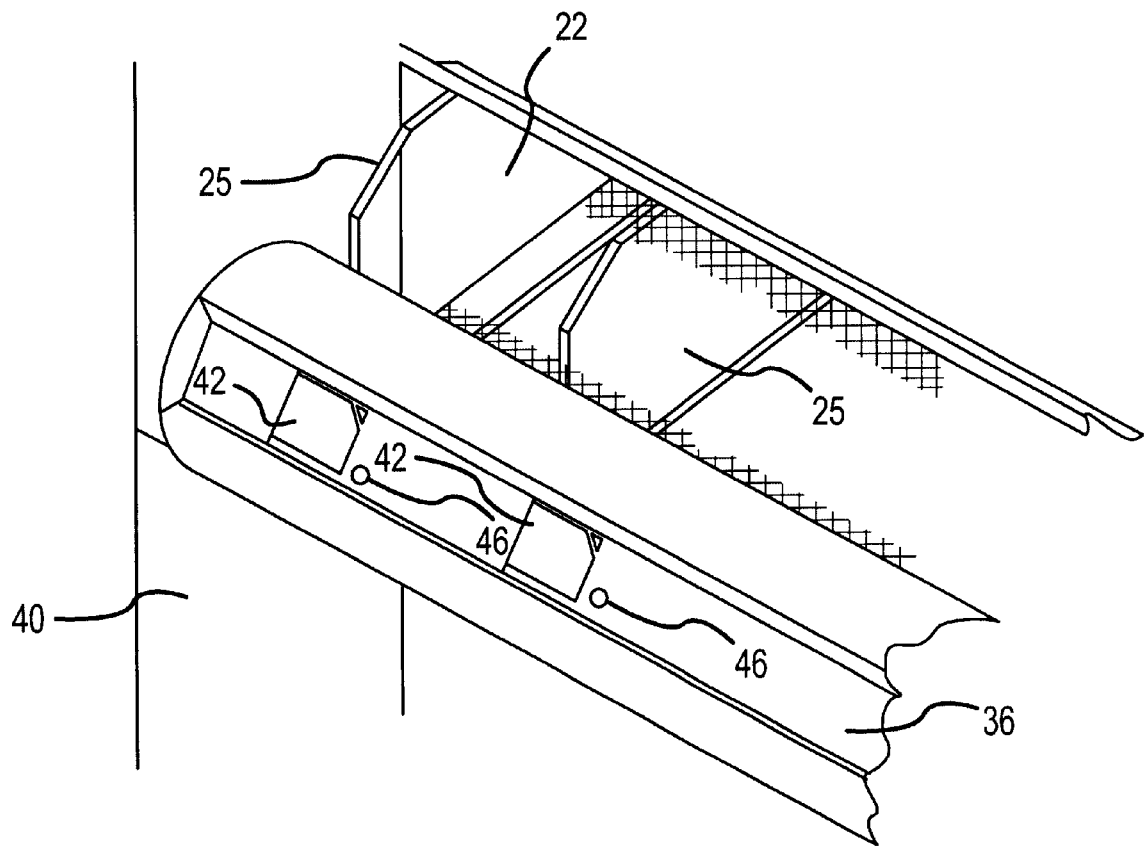
FIG. 3 is a view of end of a switch panel as depicted in FIGS. 2A and 2B.

FIG. 3 depicts a switch panel 36 inserted into one of the vertical members 40 of the dispensing units. Dividers 25 defining compartments 22, item switches 42, and visual indicators 46 are also shown in FIG. 3.

Figure 4:
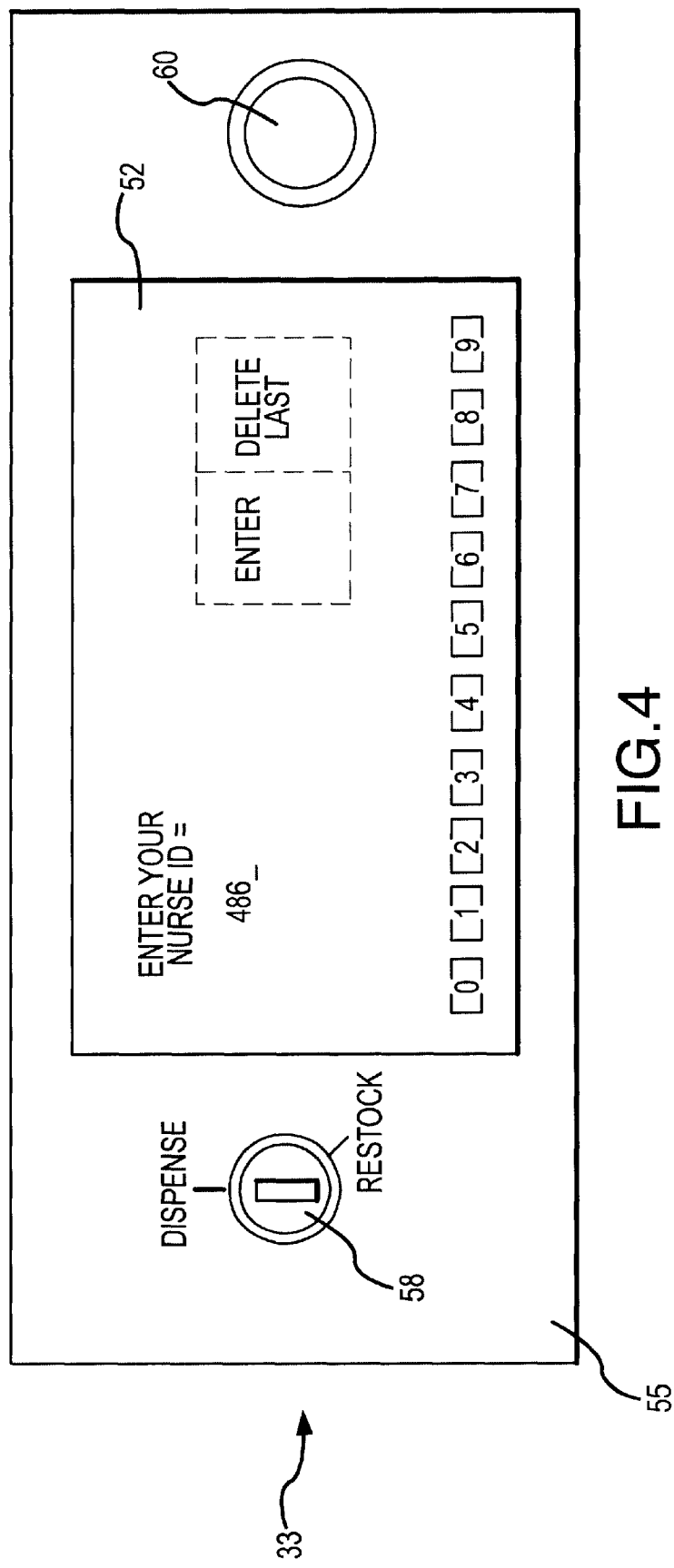
FIG. 4 depicts a front view of the processor of the dispensing unit.

Referring again to FIG. 1, the dispensing apparatus includes a processor 33 including a touch-screen display panel 52. A front view of the processor is shown in FIG. 4. As can be seen in FIG. 4, the front panel 55 of processor 33 houses a touch-screen display panel 52, a keyed locking mechanism 58, and a control override button 60. The functions of each of these elements are described below.

Figure 5:
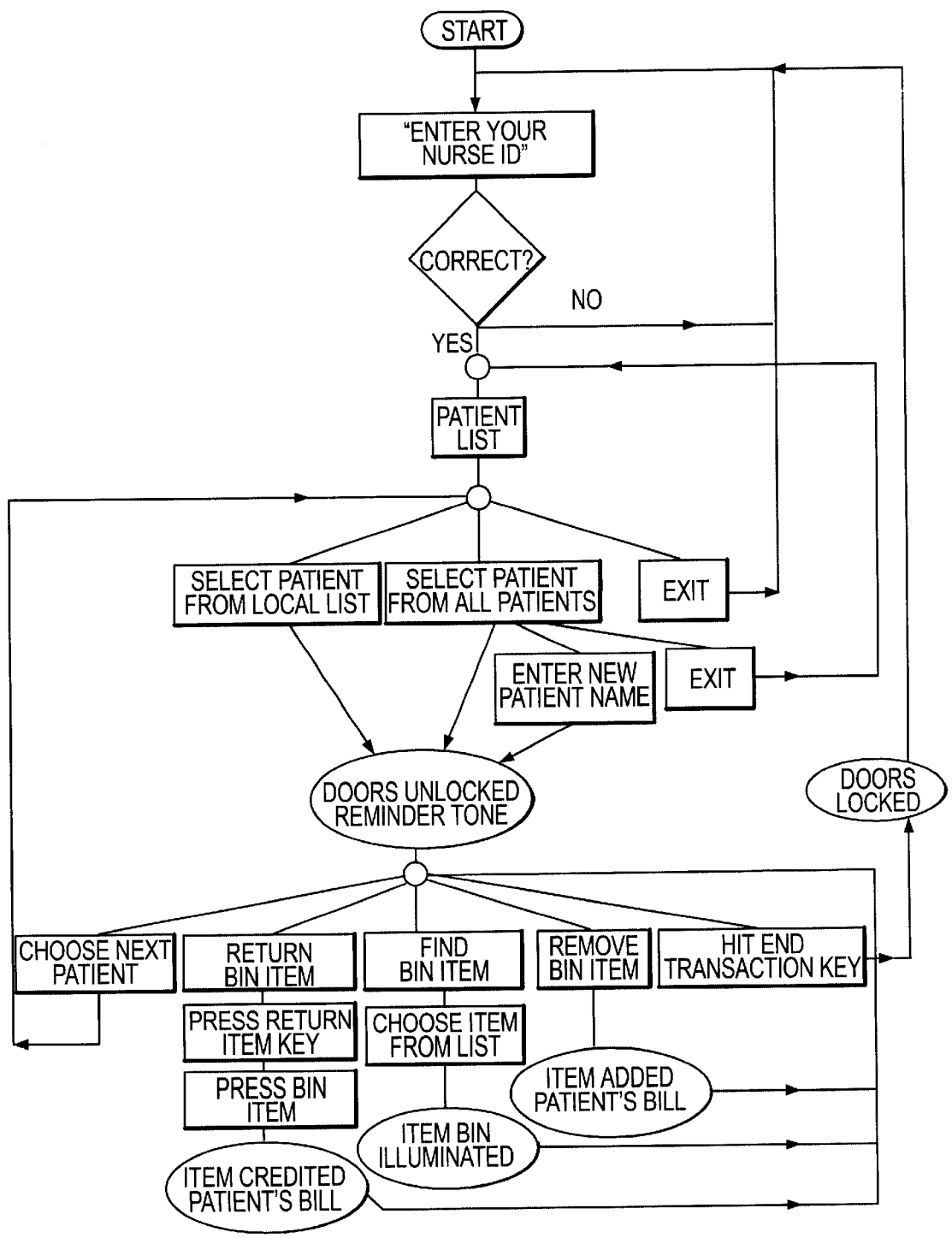
FIG. 5 is a flow chart showing the steps of removing items from the dispensing unit and recording the removal of those items.
Figure 6:
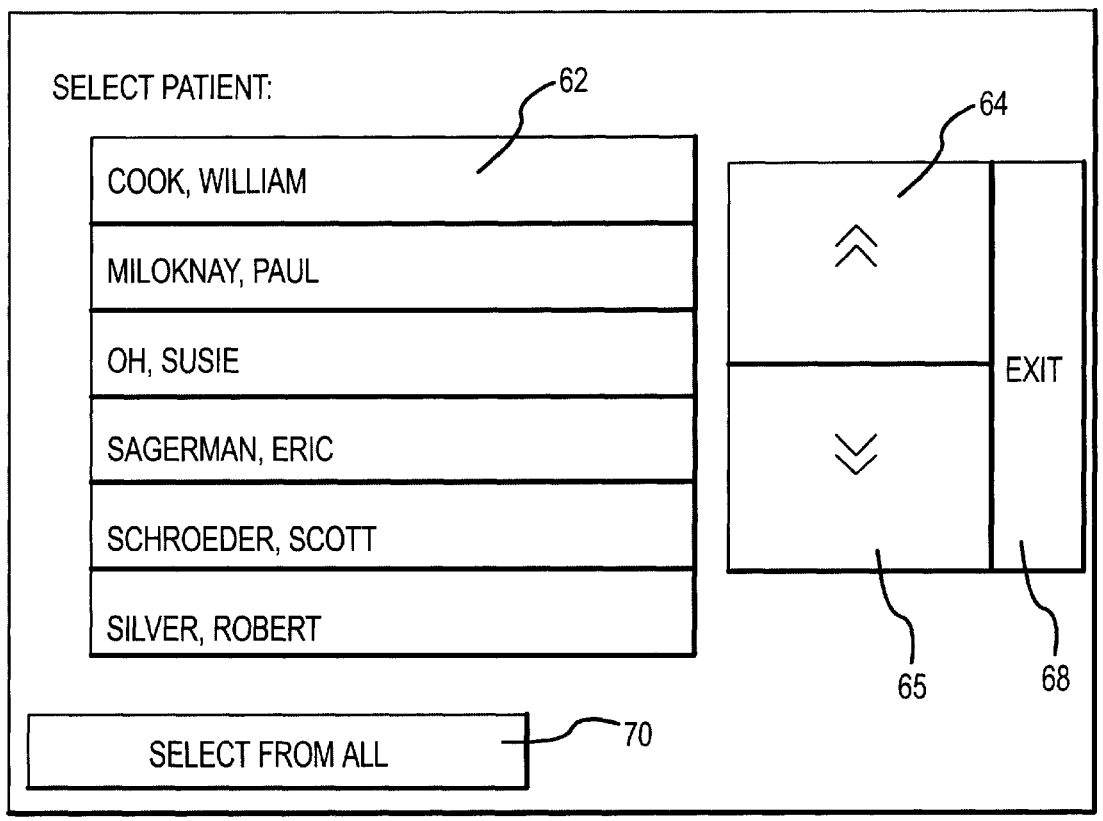
FIG. 6 shows a patient list displayed by the display panel of the processor.

A flow-chart illustrating the functions of the apparatus in its normal dispensing mode is depicted in FIG. 5. In the dispensing mode, typically no key is required to access items from the dispensing unit. Instead, the nurse or other caregiver enters an identifying code into the processor by means of the display panel 52, which is in the form of a touch sensitive screen. During entry of the Nurse ID number the display on the touch sensitive screen is as shown in FIG. 4. Referring back to FIG. 5, after the Nurse ID has been entered and verified by the processor, screen 62 displays a patient list, an example of which is depicted in FIG. 6. Although the touch sensitive screen provides a convenient means for entering information into the processor, other means are possible as well. For example, a conventional keyboard might be used. The touch screen display is particularly advantageous as an input means, however, in that it occupies the same space on the unit as does the display means.

The first patient list displayed is typically a local patient list 62, an alphabetical list of patients in rooms or other areas in the vicinity of that particular dispensing unit. For example, the local patient list may include patients in a single floor or ward of the hospital. Before dispensing medical supplies to a given patient, the caregiver must enter that patient's name into the processor, usually by selecting the name from the local patient list. The caregiver can scroll the patient list up or down by means of scroll controls 64 and 65. The caregiver may also abort the patient selection process by pressing an exit selection 68.

Figure 7:
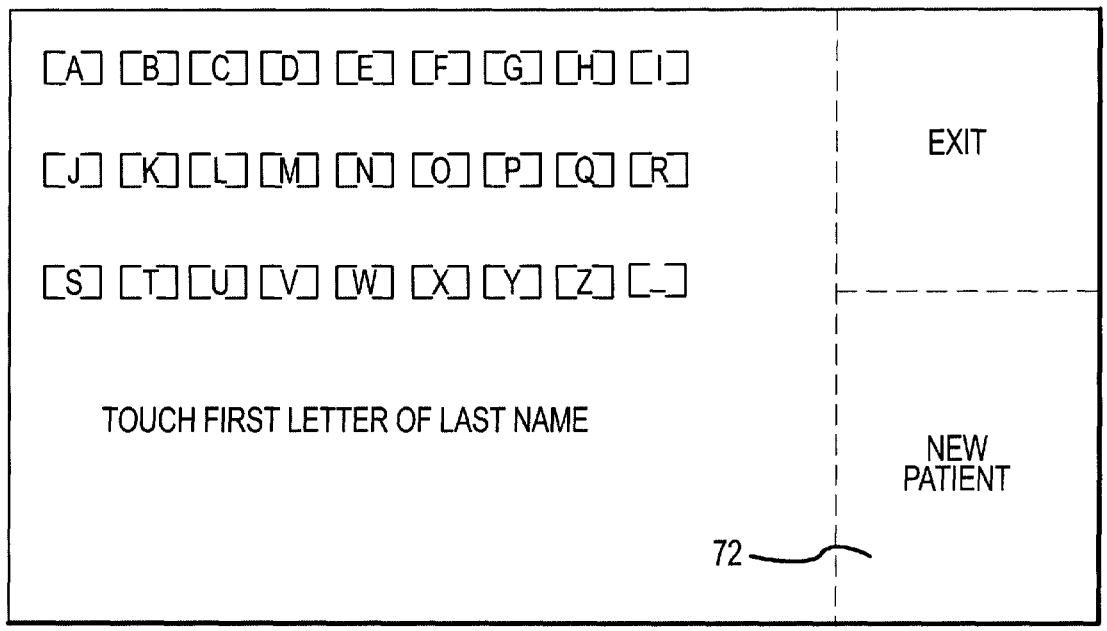
FIG. 7 depicts an intermediate screen as displayed by the processor.

If the desired patient's name is not present on the local patient list, the caregiver may attempt to locate the name from a global patient list. The global patient list typically includes all patients in the hospital. Because the global patient list may be very long, however, an intermediate screen is usually displayed as depicted in FIG. 7. The caregiver accesses the intermediate screen depicted in FIG. 7 by pressing the "Select From All" area 70 depicted in FIG. 6. The intermediate screen prompts the caregiver to touch the first letter of the patient's last name. The unit then displays a list having a format similar to the local patient list depicted in FIG. 6, but instead showing all patients in the hospital who have a last name beginning with the selected letter.

Figure 8:
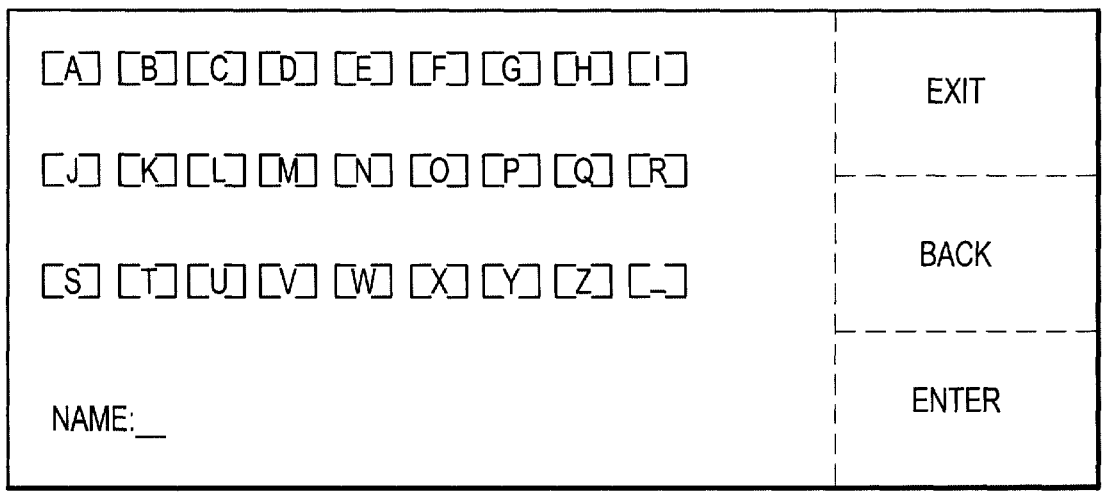
FIG. 8 depicts a name entry screen for entering a new patient name.

If the caregiver is unable to locate the desired name on the global patient list, the caregiver may return to the screen shown in FIG. 7, and press a "New Patient" selection 72 to initiate entry of a new patient name. In response to the caregiver's request to enter a new patient name, a new patient entry screen is displayed as depicted in FIG. 8. The caregiver then enters the new patient name by touching the appropriate sequence of letters on the screen. The new patient name is stored in memory in the processor for later downloading and reconciling with the hospital's central patient records.

Figure 9:
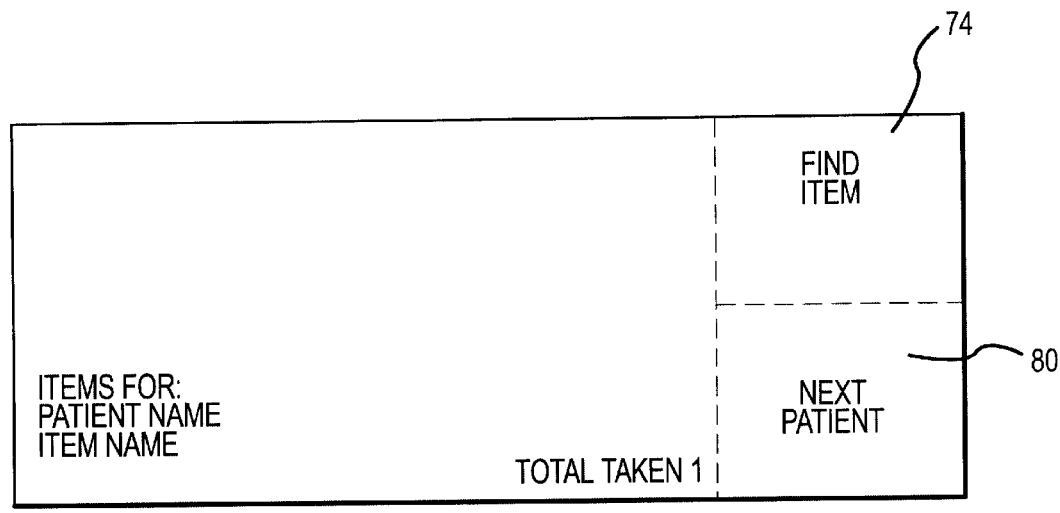
FIG. 9 provides a view of the screen displayed by the processor as items are removed from the dispensing unit.

Referring back to FIG. 5, once the patient name has been entered, whether from the local or global patient lists, or from the new patient entry screen, the processor sends signals to unlock the doors of the dispensing unit so that the caregiver can take supplies from the compartments. At the same time, a reminder tone sounds to indicate that the doors are unlocked and a screen is displayed as shown in FIG. 9. The caregiver may then begin removing items from the dispensing unit.

Items may be removed from the dispensing unit according to either of two different methods. First, if the caregiver knows where the desired items are located on the cart, the caregiver may remove the items from their compartments while recording the removal of those items using the item switches located near each compartment. According to the second method, if the caregiver desires assistance in locating a particular item on the cart, the caregiver may select the desired item from an alphabetical list of items on the touch-sensitive display. Upon selecting the desired item, a visual indicator in close proximity to the item is activated, thereby providing the caregiver with a convenient means for locating the item on the dispensing unit. After locating the item, the caregiver may remove the item from the dispensing unit and record the item's removal using the item switch associated with that item. Both methods for removing items and recording their removal from the dispensing unit are described more fully below.

If the caregiver knows the location of the desired item, the caregiver simply opens the door on the dispensing unit, takes the desired item from its compartment, and records the removal of the item from the unit. Removal of the item is recorded simply by pressing the item switch 42 (see FIG. 3) associated with the given item once for each item removed. If the caregiver takes, for example, three gauze pads, the caregiver presses the item switch under the compartment containing the gauze pads three times. The number and type of each item removed are recorded and stored in the processor along with which patient that item has been taken for.

In preferred embodiments, the processor on the dispensing unit is electronically connected to the hospital's central recordkeeping equipment. From time to time, the records corresponding to items taken from the unit are sent to the central record keeping equipment. In this way, records may be maintained in the central equipment that reflect the types and numbers of items taken from and currently held by each dispensing unit in the hospital.

The unit includes means for correcting mistaken entries and returning unneeded items to the unit. If, for example, three gauze pads are taken, but only two are needed, the caregiver may return the remaining pad to the proper compartment. The caregiver then activates cancel switch 49 (see FIG. 2A), located at one end of the switch panel 36 under the item's compartment. After cancel switch 49 has been activated, the caregiver presses the appropriate item switch 42 once for each item returned to the compartment. This causes information to be recorded in the processor so that the unused item is not included on the patient's medical record or bill.

Figure 10:
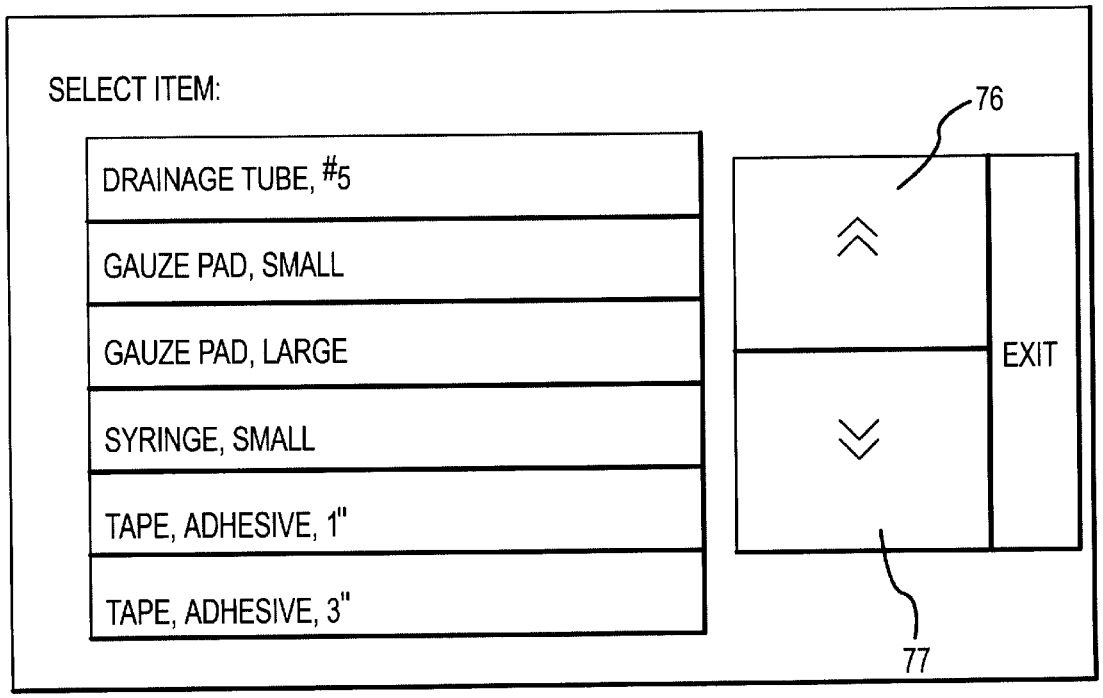
FIG. 10 is an item list as displayed by the processor.

If the caregiver desires assistance to locate an item on the dispensing unit, the care giver may press the area 74 labeled "Find Item" on the screen display depicted in FIG. 9. The touch screen then displays an alphabetical list of items like the one shown in FIG. 10. The caregiver can scroll up or down the list by pressing scroll controls 76 or 77 until he locates the desired item on the list. When the caregiver finds the desired item on the list, he selects that item from the list by pressing the area corresponding to that item.

In response, the processor sends a signal to light the visual indicator 46 (see FIG. 3) located below the compartment holding the selected item. The caregiver may then locate the desired item simply by looking for the lighted indicator. Once the caregiver has found the item on the dispensing unit, the caregiver may remove the item and record its removal in the same manner as described above, i.e., by pressing the proper item switch once for each item taken. If the item selected from the alphabetical item list is not on that particular dispensing unit, the processor, instead of lighting a visual indicator, causes the touch screen to display information about where in the hospital that item can be located, e.g. in a particular supply room or on another dispensing unit.

Once the caregiver has finished removing items for a given patient, the caregiver touches the area 80 labelled "Next Patient" (see FIG. 9) on the touch screen. In response, the screen returns to the display depicted in FIG. 6 so that the name of another patient can be entered and items removed for that patient in the same way as described above.

When the caregiver has finished removing items from the compartments, the caregiver presses an end transaction button 82 (see FIG. 11) located inside the cabinet on the vertical member 40 and just above the door handle. As depicted in FIG. 5, this relocks the cabinet doors, and returns the processor to its original state awaiting entry of the next Nurse ID code.

Referring back to FIG. 4, the dispensing unit includes a feature to allow for the immediate dispensation of items in an emergency or other situation in which it is desired to dispense items without stepping through the process described above. An override button 60 is located on front panel 55 of processor 33. Pressing override button 60 bypasses the processor controls to immediately unlock the doors of the dispensing unit. In an emergency, items may be removed from the unit with the removal of those items recorded later. Thus, a means is provided so that the automated inventory control function of the present invention will not prevent prompt access to the medical supplies in an emergency situation.

The dispensing unit will be restocked to replace depleted items as necessary. Restocking of depleted items is normally performed by a supply technician or another member of the hospital staff. The restocking procedure is depicted in the form of a flow chart in FIG. 12. To begin restocking items, the staff member inserts a key into lock 58 (see FIG. 4) on the face of processor 33 and turns the key to switch the processor into a restock mode. While the processor in this embodiment is switchable to the restock mode by means of key lock 58, the modes could be switched by other means such as, for example, a simple switch or an option displayed on the face of the touch sensitive screen. Use of the key lock is advantageous in that it will tend to reduce errors by the staff due, for example, to switching the unit into restock mode unintentionally.

After putting the unit into the restock mode, the staff member enters a Restock ID code into the processor. After the processor confirms that the Restock ID is correct, the staff member selects one of three options, restock, one touch restock, or countback, by entering the desired selection into the processor.

Ordinarily, the one touch restock option provides the quickest and most convenient method for restocking the unit. Before the unit is restocked, a refill report is prepared listing the items taken from the unit since the unit was last restocked. The refill report can be conveniently prepared by the central recordkeeping equipment based on the records stored in the processor and sent to the central recordkeeping equipment as the items were taken from the cart. The staff member gathers the items listed on the refill report and brings them to the cart. At the same time, information corresponding to the refill report is sent to the unit via an electronic connection between the unit and the hospital recordkeeping equipment.

When the technician enters the one touch restock mode, the visual indicator 46 (see FIG. 3) corresponding to the first item on the refill report is activated. The staff member replaces the correct number of items in the proper compartment, which the staff member can find quickly and conveniently with the help of the lighted LED or other visual indicator. After placing the items in the compartment, the staff member records the replacement by pressing the item switch 42 (see FIG. 3) corresponding to that item one time. This indicates to the processor that the number of items shown on the refill report have been placed in the compartment. The LED for that item switches off, and the LED corresponding to the next item on the list switches on. This procedure is repeated for each item on the refill list until all the item compartments are restocked to the desired level.

Figure 12:
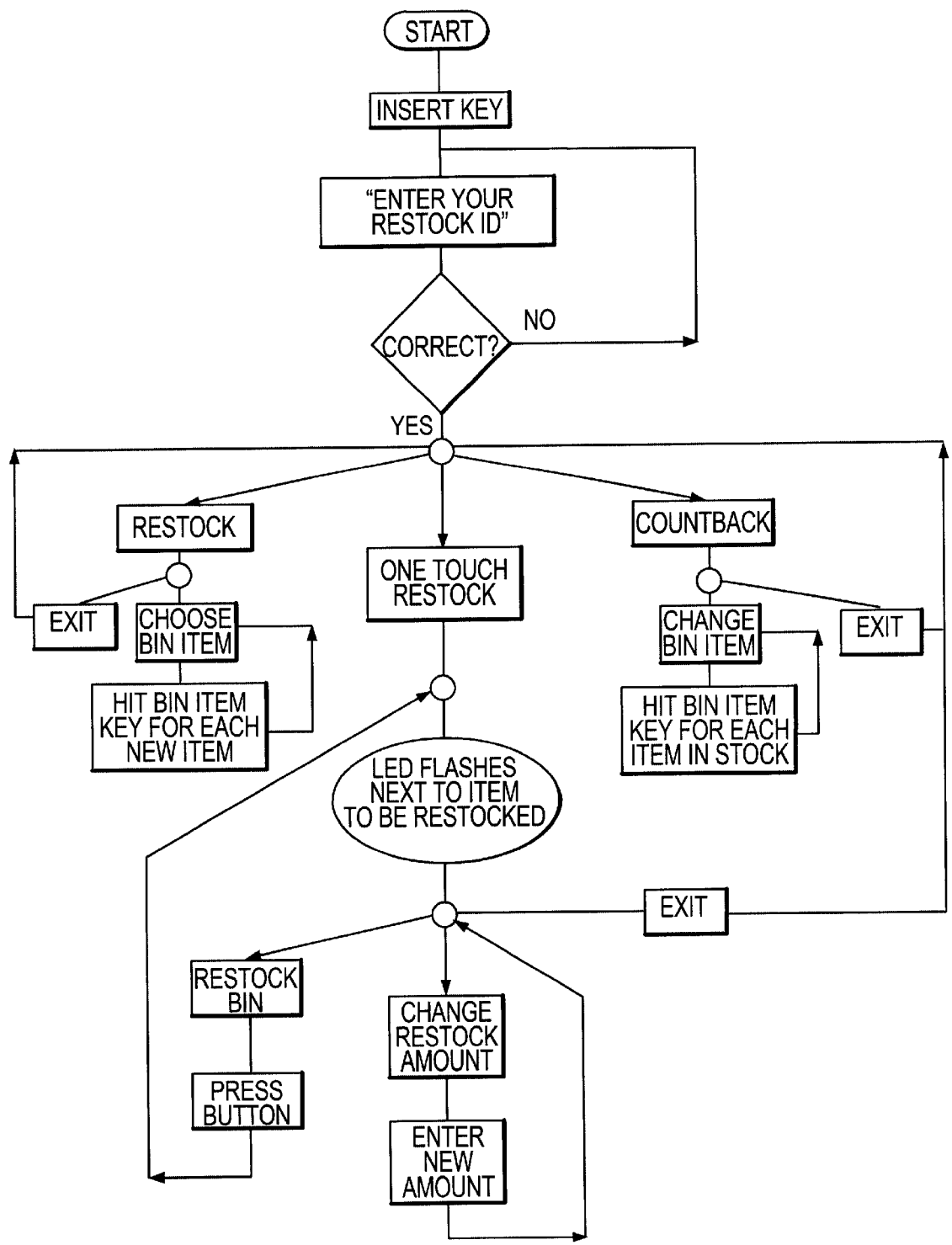
FIG. 12 is a flow chart depicting the procedure for restocking the dispensing unit.

If the number of items actually placed on the unit differs from the number on the refill report, the technician may change the restock amount by making an appropriate entry into the processor through the touch sensitive display panel as indicated in FIG. 12.

The unit may also be restocked without using the one touch restock method. This might be preferred, for example, if only a few items are to be replaced or if no refill report is available. If this is the case, the technician uses the restock option from the display panel. The technician may select the desired item from a list of items on the display panel. The proper LED then lights to assist the technician in finding the appropriate compartment. Alternatively, the technician may locate the desired compartment directly without going through the item list. When the proper compartment is located, the technician places the appropriate number of items into the compartment and presses the corresponding item switch one time for each item placed in the compartment. Note that this method differs from the one touch restock method in that the item switch is pressed once for each item placed in the compartment. In contrast, in the one touch restock method, pressing the item switch one time indicates the replacement of a number of items corresponding to the number shown on the refill report.

Errors made during the restocking procedure may be corrected using the cancel switch 49 (see FIG. 2A). For example, if the refill list indicates that two syringes are to be placed in a given compartment but the staff member mistakenly places three syringes in the compartment, the cancel switch may be used to correct the overstock. The staff member simply removes one syringe from the compartment, activates cancel switch 49, and presses the proper item switch 42 once for each syringe removed. At the end of the restocking session, the cabinet doors are closed and the key removed by the staff member. The processor relocks the doors and the system is reset for the next dispensing session.

Over time, discrepancies will inevitably arise between the number of items supposedly on the dispensing unit and the number of items actually present. It may therefore be desirable for a staff member to periodically reconcile the computer inventory list and the actual number of items. To begin this "count back" procedure, the staff member selects the count back mode by an appropriate entry into the display panel. The staff member then physically counts the number of items actually present in each compartment of the dispensing unit. The staff member presses the proper item switch once for each item on the unit. That number is stored in the processor as the correct and updated number of items actually on the unit. The new numbers are compared with the numbers previously stored in the computer and a discrepancy report is prepared based on differences between the two. This discrepancy report can be used for inventory control and to reconcile patient billing records.

In an alternative method for restocking the dispensing unit, the dispensing unit can simultaneously activate the visual indicators for every compartment that needs to be refilled with items. This provides a convenient way for the staff member to choose the order of restocking. According to this method, once the unit has been put into the restock mode and the Restock ID code has been entered, a refill report is generated as previously described. The staff member can then gather the items in the report. The dispensing unit can then be placed in a mode where the visual indicators for every compartment needing to be refilled are activated by the dispensing unit. The staff member can then choose which compartment having a lighted indicator to fill first. When the first selected compartment is restocked, the staff member records the placement of the items by pressing the item switch as previously described. This deactivates the visual indicator for that compartment. This cycle is repeated for each compartment until all the visual indicators are deactivated and the unit is restocked.

Figure 13:
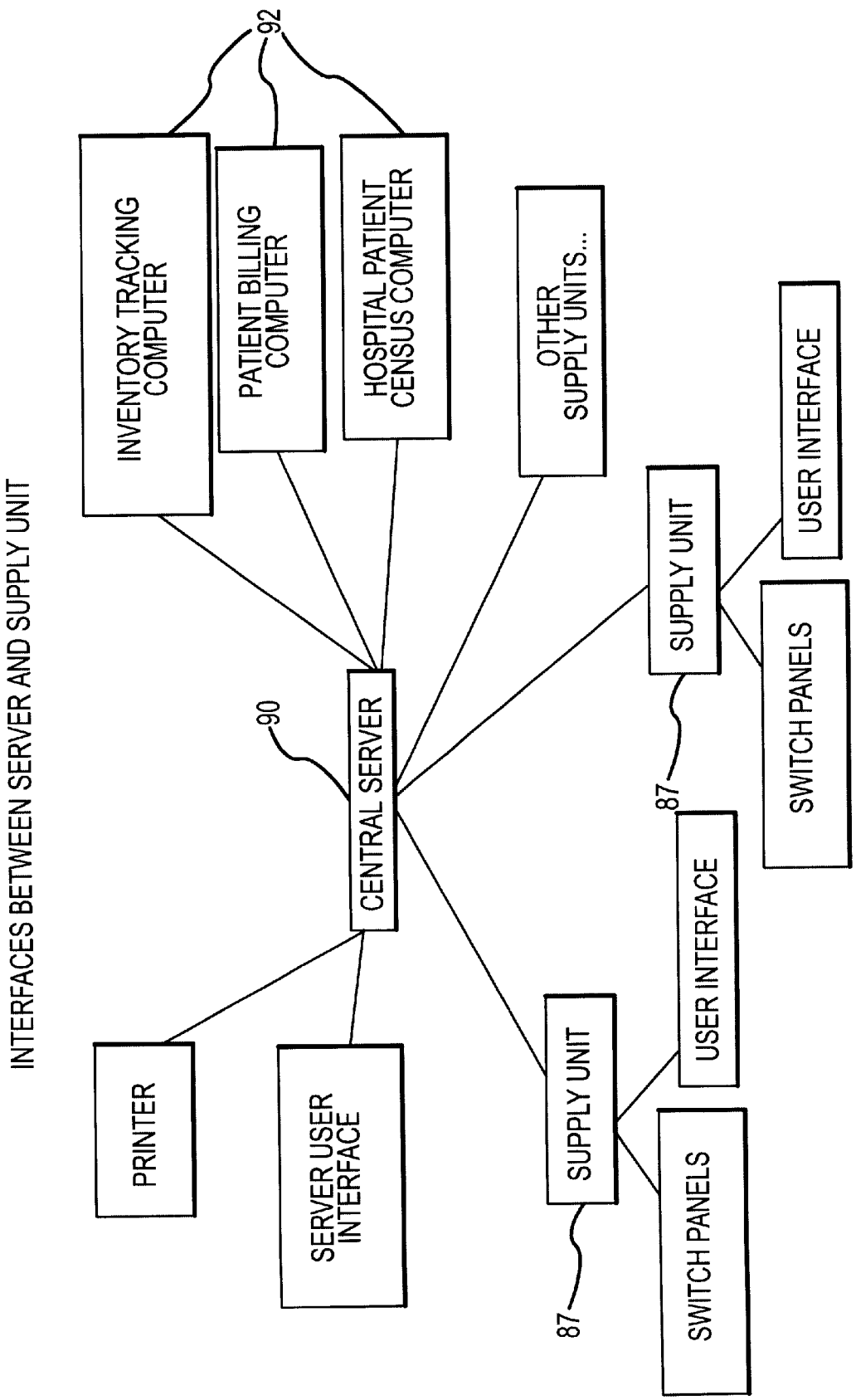
FIG. 13 is a symbolic depiction of the connection between the dispensing unit of the present invention and the hospital's central computer record keeping equipment.

Inventory records kept in the processor include the number of items on the dispensing unit along with a list of items dispensed to individual patients. In preferred embodiments, means will be provided so that the individual dispensing units located at various places in the hospital may communicate data with the central hospital computer system. This is illustrated graphically in FIG. 13, in which a number of dispensing units 87 are connected to a central server 90, which is in turn connected to other elements 92 of the hospital computer systems.

The connection between the dispensing units 87 and the central server 90 may advantageously be made over phone lines in the hospital. In such cases, a modem will typically be included in the processor for making the connection with the central server. If this is done, the central server may call each remote unit periodically to collect updated information for the preparation of inventory records, patient billing records, refill reports, resupply orders, or related purposes.

In an alternative embodiment to the method described in FIG. 5, additional security is provided for the inventory of items stored in the dispensing unit. Additional security is provided by having at least two doors on the dispensing unit, each door being associated with a separate compartment, and by allowing access to only one compartment at a time. Like the embodiment described in FIG. 5, once nurse identification and patient information have been entered into the dispensing unit, all doors unlock but remain closed. Once a door is selected and opened, however, all the remaining doors lock. Hence, only items from the compartment with the opened door can be removed.

If the caregiver actuates the item input device (or enters item removal information) when removing an item from the compartment, subsequent access to the items held in the compartments behind the locked door will be provided as follows. Once the item input device is selected and the door is closed, all doors again unlock. The caregiver can then select another door and the cycle is repeated. If the caregiver fails to enter item removal information before closing the door, all doors will remain locked to deny access to any item in the dispensing unit.

This embodiment insures that access to only one compartment at a time will be provided. If the caregiver is diligent in recording removal of an item from one compartment, the dispensing unit will respond by allowing subsequent access to another compartment.

An further alternative embodiment of a device and method for dispensing items from a dispensing unit provides additional security for the inventory of items stored in the unit. This embodiment functions essentially the same as the previous embodiments just discussed except that the dispensing unit is configured so that no items can be removed until patient identification and item identification information is entered into the unit. For example, if a caregiver wished to remove a particular item, the caregiver would be required to enter both the patient's name or some other information identifying the patient who is to use the item and the specific item to be taken. Once this information is entered into the unit, the item is then made available for removal. This embodiment thus provides additional inventory security by ensuring that information relating to at least one item and one associated patient will be input into the dispensing unit before an item can be removed. Such an embodiment is especially helpful when the caregiver is negligent in identifying a particular item after it has been removed.

Although additional security is provided by this embodiment, the convenience to the caregiver in obtaining the items is not lessened. A caregiver can easily enter user and/or patient identification information as discussed in connection with previous embodiments. To select an item, all that is required is to touch an item switch corresponding to the item's location. In case of an emergency, an override switch can be selected to allow access to the items.

To further promote convenience to the caregiver, a further aspect of this embodiment provides for the input of patient and item identification information into the dispensing unit in any manner, and not just by the use of item switches or the like. For example, an item can be made available for removal by a voice-activation system associated with the unit. The voice activation system allows information relating to the patient's name and the item to be removed to be entered into the unit simply by speaking into the unit. A corresponding speaker system connected with the unit is able to confirm the information input by the user and further direct the user in the selection and removal process.

Figure 14:
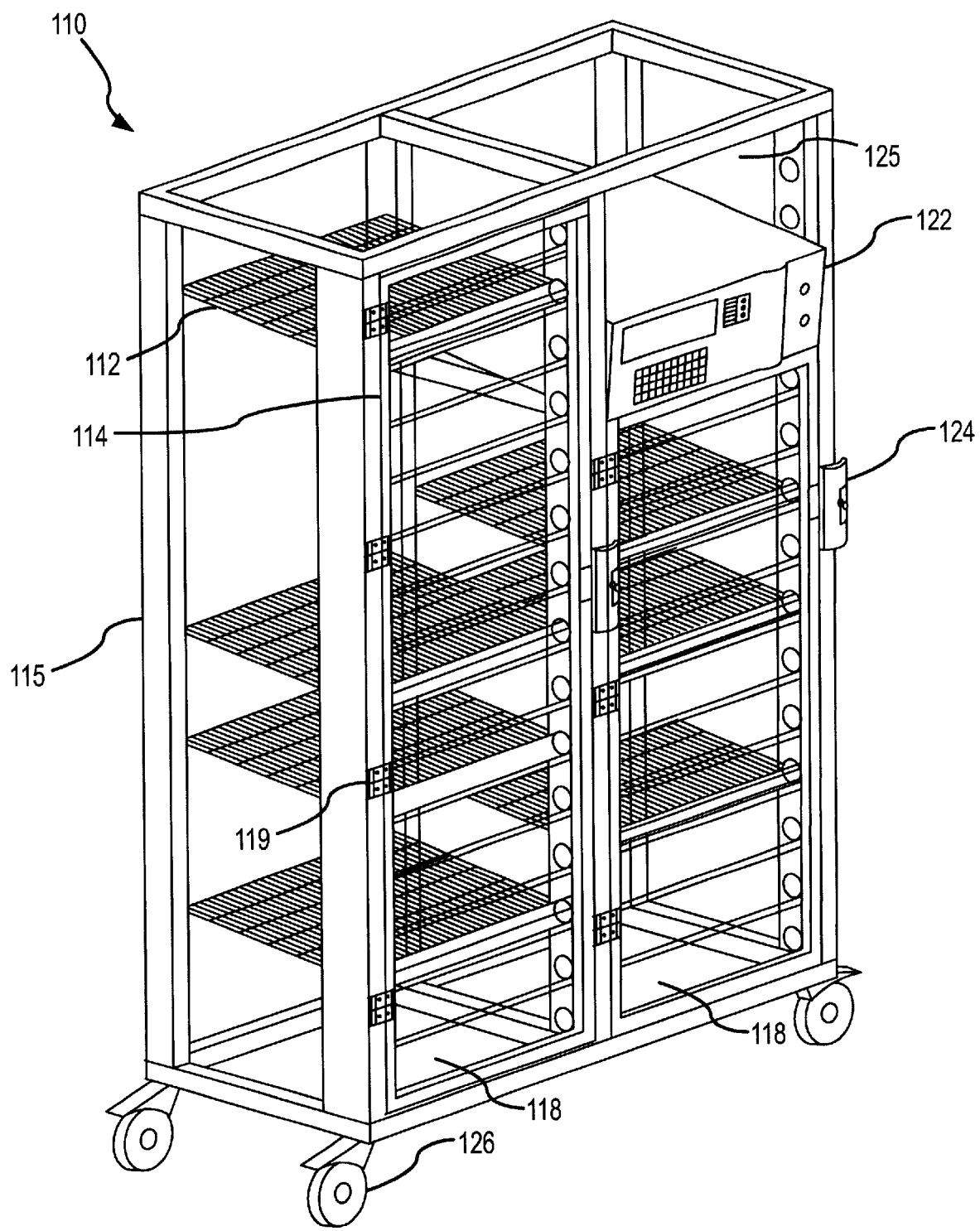
FIG. 14 depicts an alternative embodiment of a dispensing unit according to the present invention.
Figure 15:
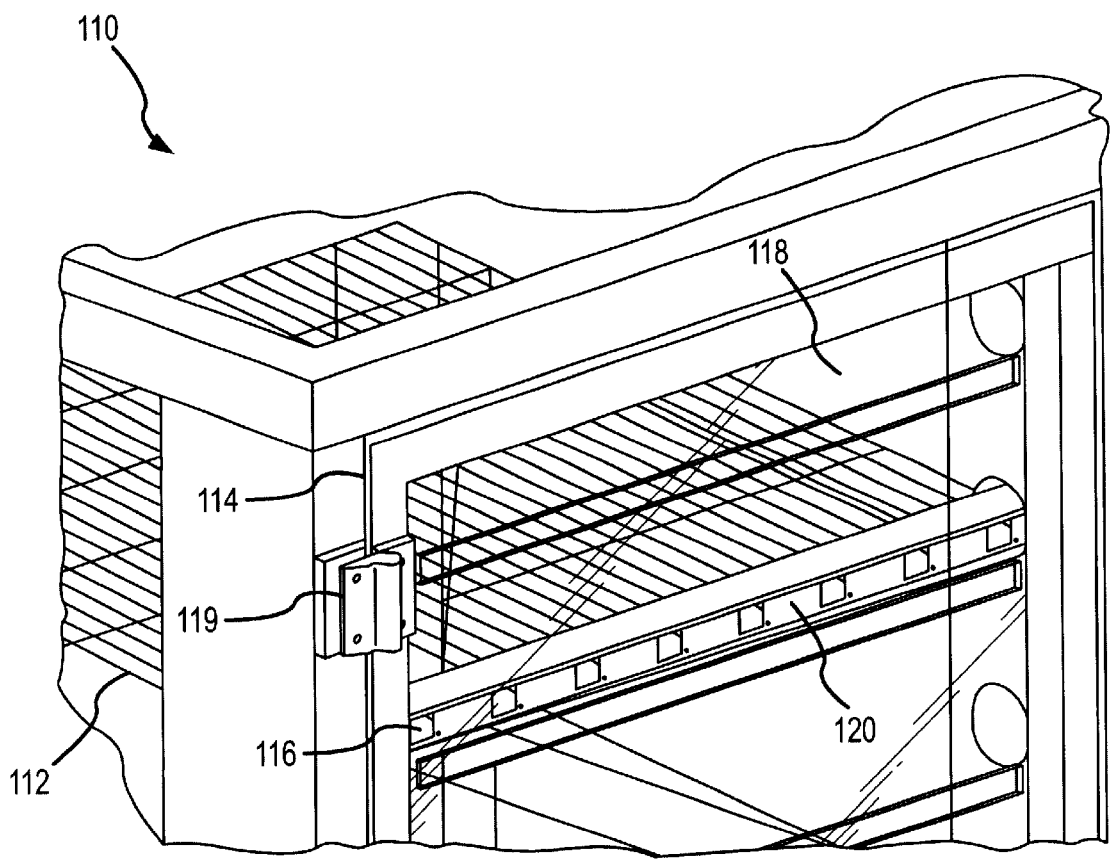
FIG. 15 is a detailed view of an upper portion of the dispensing unit of FIG. 14 showing input devices on the unit.

Turning now to FIGS. 14 and 15, an embodiment of a dispensing unit 110 particularly suitable for preventing items from being removed until both patient and item identification information are entered will be described. The dispensing unit 110 has a plurality of storage locations, preferably horizontal shelves 112, within an interior portion 113 of the unit 110. The storage locations can be configured in any fashion so long as the items located within the unit 110 are stored in an organized fashion. For instance, if shelves 112 are used, they can be movable to adjust the vertical heights of the compartments, or the shelves 112 can be divided into multiple compartments by the use of dividers (not shown). The shelves 112 are accessible through a pair of front doorways 114, each of which is covered by one or more latchable doors 118, as described hereinafter. Associated with each storage location is at least one item input device 116 for inputting item identification information. Since the item input device 116 is in close proximity to the associated storage location, the input device 116 can be selected or actuated by the caregiver to indicate the item to be taken. The shelves 112, dividers (not illustrated), and input devices 116, may be configured identically to the corresponding components of the dispensing unit 110 as illustrated in FIGS. 1–3. Dispensing unit 110 differs from the previous embodiments in the design of the latchable doors 118 and in the method by which the door may be opened.

To prevent access to the stored items until the required information is entered, a transparent door (or plurality of doors) 118 is positioned across the doorway 114, preferably by hinges 119. The door 118 is configured so that the item input devices 116 will be accessible to the caregiver through the door(s) at all times, i.e. even when the door is closed. This is accomplished most simply by providing a plurality of openings 120 within the door 118 or by using a plurality of transparent doors that are vertically spaced-apart from each other so that horizontal gaps are created between the doors and aligned with the item input devices 116. The former embodiment where a single door 118 covers each doorway 114 and includes a plurality of horizontal openings aligned with rows of input devices is indicated in FIGS. 14 and 15. The openings 120 are aligned with each potential shelf location (even if a shelf location does not contain a shelf 112) so that if a shelf 112 is inserted, the input devices 116 corresponding to that shelf location will be accessible through the door 118.

In an alternative embodiment, the openings 120 can be substituted with a plurality of resilient buttons slidably mounted in the door. The buttons are aligned in rows to correspond to each potential shelf location (even if the row does not contain a shelf) so that if a shelf is inserted, the buttons will correspond to the input devices on the shelf. Each input device can be actuated by pressing the corresponding resilient button on the door. This allows the door to remain locked while providing access to the input devices as previously described.

Figure 15A:
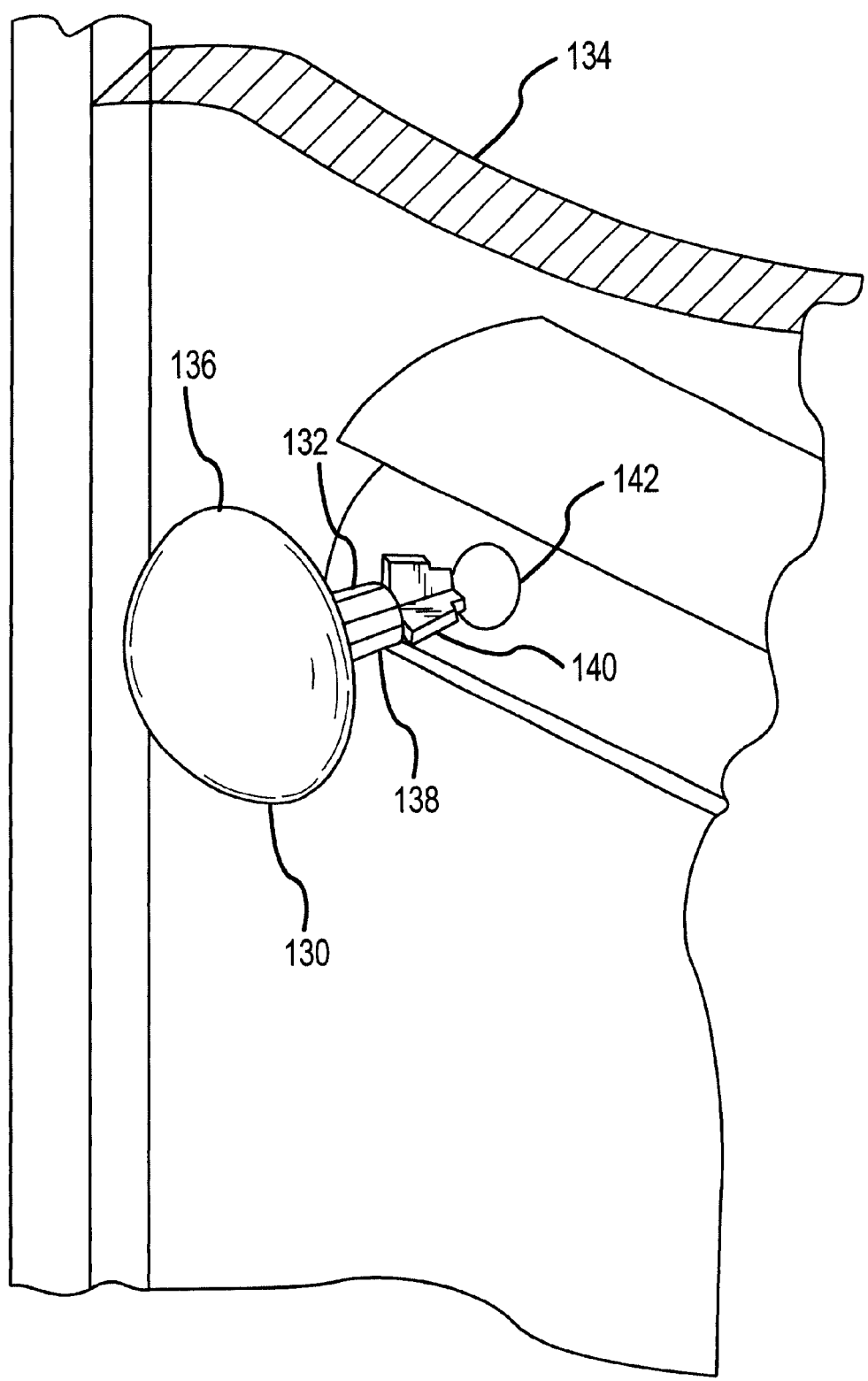
FIGS. 15A and 15B illustrate an alternative embodiment of a dispensing unit having a resilient button in the door for actuating an input device.
Figure 15B:
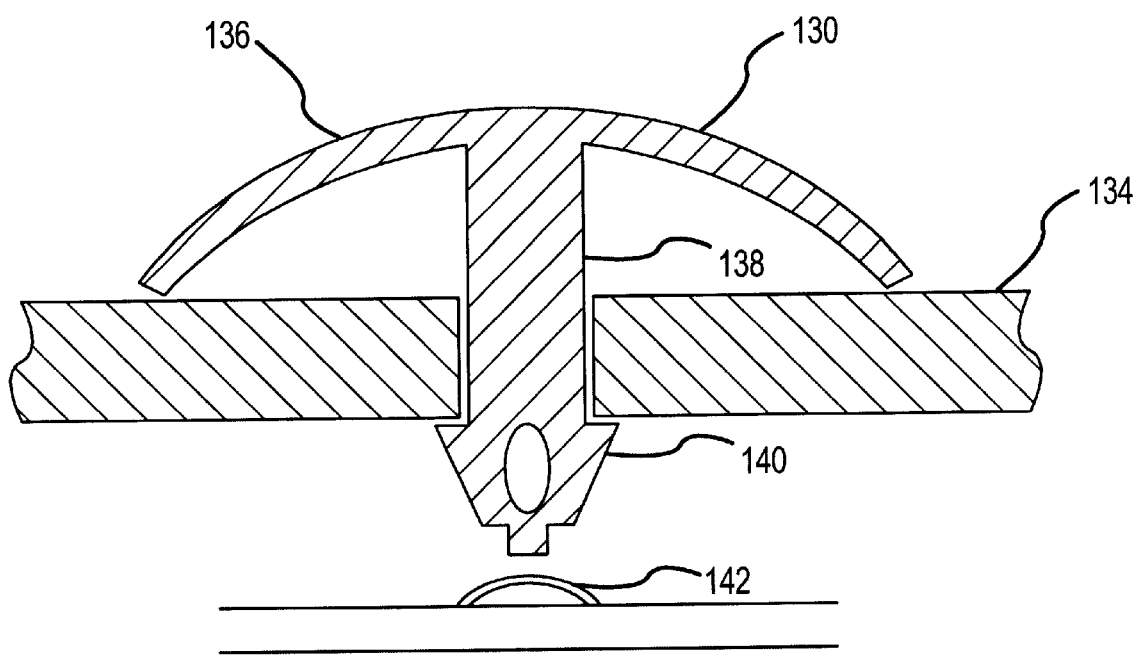

As shown in FIGS. 15A–15B, a resilient button 130 is mounted within an opening 132 of door 134. The button 130 has a head 136 attached to a shaft 138. A distal end 140 of the shaft 138 is radially expanded to allow the button 130 to remain secured in the door 134. Each button 130 is slidably mounted in the door 134 and can be axially advanced towards a corresponding input device 142 by pressing the head 136. The head 136 is resilient so that when it is depressed, the distal end 140 will contact the input device 142 and supply a sufficient force to actuate the input device 142. When the head 136 is released, the distal end 140 will be axially retracted away from the input device 142 by the resilience of the head 136. Alternatively, the button 130 can have a spring between the head 136 and the door 134 to bias the distal end 140 away from the input device 142 until the button 130 is depressed. After the button is released, the spring will cause the button 130 to return to its starting position.

The door 118 can be secured across the doorway 114 in any manner so long as the door 118 can be opened upon the entering of the required information. Preferably, the door will have a mechanical latch (similar to the latch described in connection with FIG. 1 above) which holds the door in a closed position until the information is entered. Alternatively, the door can be electro-magnetically held in place until the information is entered.

If only one door 118 is provided, all items in the dispensing unit 110 will be accessible to the user once the door 118 has been opened. To provide further security, the number of doors can be increased as desired until only one door is associated with each shelf 112. Since the input device 116 will unlock only one door, the amount of security will increase with the number of doors. Accordingly, depending on the level of security required by the caregiver, the dispensing unit 110 can be provided with the appropriate number of doors.

Figure 16:
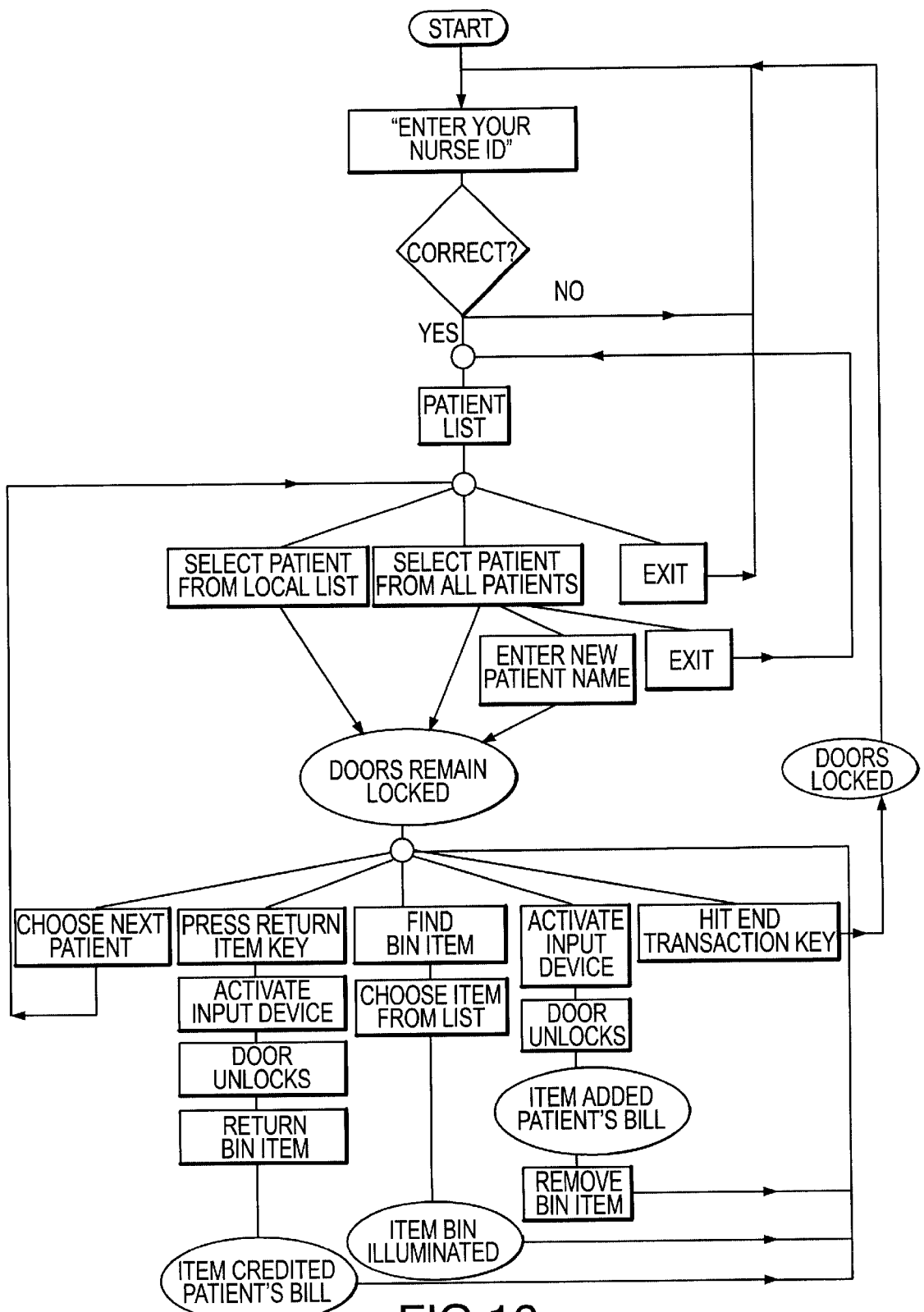
FIG. 16 is a flow chart showing the steps of removing items from the dispensing unit and recording the removal of those items after both patient and item identification information have been entered.

As previously discussed, the door 118 can be opened once patient and item identification have been entered. Patient identification information is entered into a controller 122. The controller 122 is connected to the item input devices 116 and the latch. The controller 122 may be configured to be identical to the processing unit described in connection with FIGS. 1–13, and information entered into the controller 122 may be entered in essentially the same manner as previously described. Controller 122 differs from the processing unit in the previous embodiment illustrated in FIG. 1 in the manner in which signals are sent to unlock the doors 118. Instead of unlocking the doors 118 immediately after inputting patient information as shown in FIG. 5, the doors 118 are not unlocked until both patient identification information and item identification information have been entered as illustrated in FIG. 16.

Figure 11:
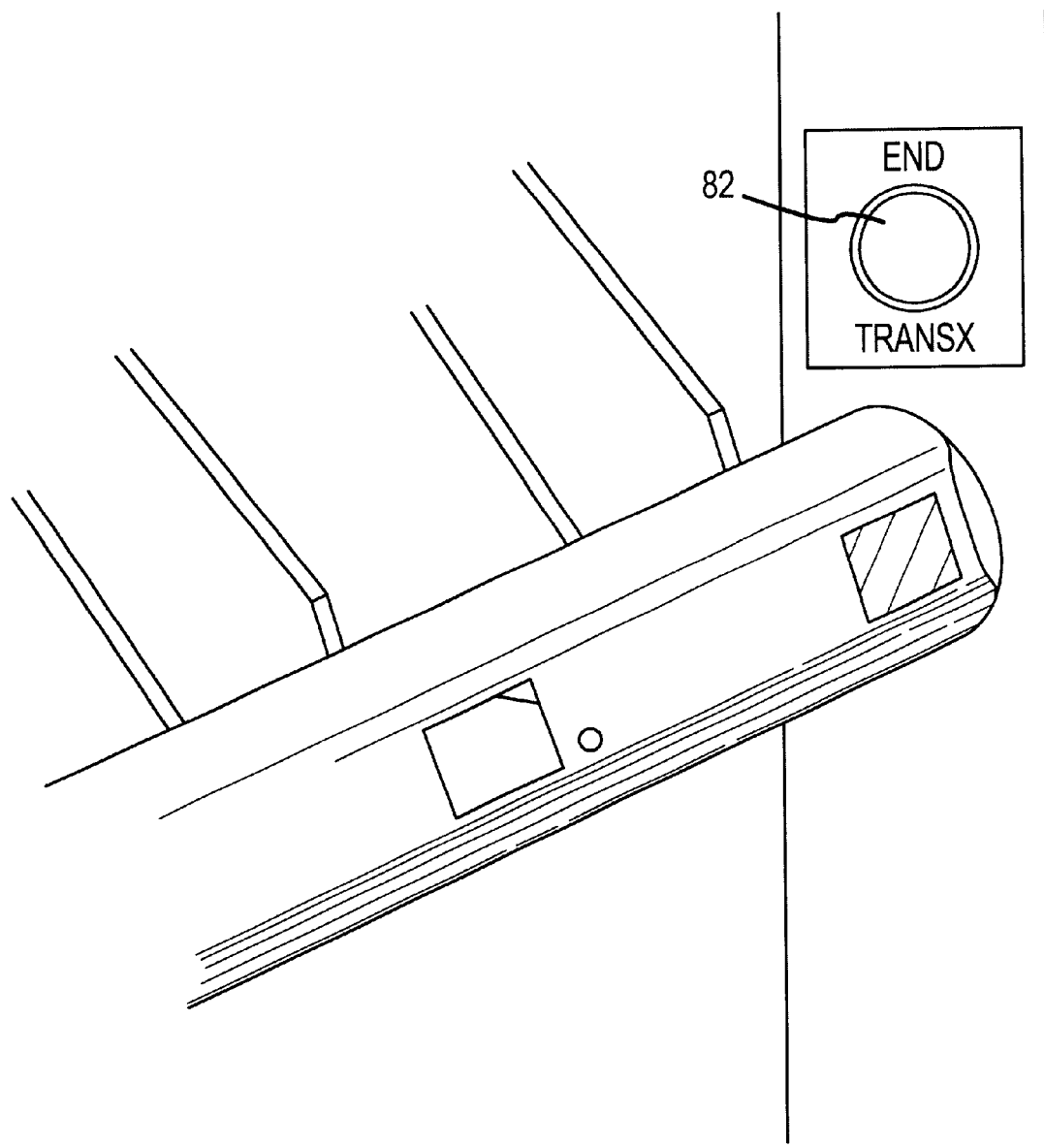
FIG. 11 is a depiction of one end of a switch panel showing a cancel switch and an end transaction switch.

After the required information is entered into the controller 122 and the appropriate input device 116 is selected, the controller 122 produces a signal which releases the latch and allows the door 118 to be opened and also produces a record of the item to be removed. If multiple items for the same patient are to be removed, the caregiver presses the associated item input device 116 once for each item removed as previously discussed in connection with FIG. 3. If the caregiver wishes to remove items for another patient, the caregiver enters new patient identification information into the controller in a manner similar to that discussed in connection with FIG. 9 and repeats the process just described. After all desired items have been removed, the doors 118 are closed and end transaction key (not shown) similar to that discussed in connection with FIG. 11 is selected. The door 118 is then locked preventing removal of any further items. Alternatively, the dispensing unit 110 can be configured so that once the door 118 is closed it will lock thereby requiring activation of the appropriate input device 116 before the door 118 will again unlock.

If an item needs to be returned, and the patient's account credited, the caregiver selects a return item key (not shown) and activates the corresponding input device 116 to unlock the door 118 and record the return of the item to the patient's account.

To assist in opening the door 118, a handle 124 associated with each door can be provided. Further, the dispensing unit 110 can be provided with a set of wheels 126 to increase the portability of the unit 110. The handle 124 and wheels 126 are essentially identical to those described in FIG. 1.

The invention has been described in considerable detail for purposes of understanding. However, alternative uses for the invention will occur to those skilled in the art. In particular, although the invention has been described as being especially useful for dispensing medical supplies, the invention may be used advantageously in other settings as well, e.g., for dispensing medical equipment or pharmaceuticals. Furthermore, modifications and improvements may be made without departing from the scope and spirit of the invention. Therefore, the above description should not be taken as limiting the scope of the invention. Instead, the scope of the invention should be determined chiefly with reference to the appended claims, along with the full scope of equivalents to which those claims are entitled.

What is claimed is:

1. A method for dispensing items from a dispensing unit holding the items, the method comprising:

providing a dispensing unit having a lockable door, a plurality of storage locations located within the dispensing unit and behind the same lockable door so that access to the plurality of storage locations is prevented when the door is locked and closed, and at least one item switch located adjacent to each storage location;

entering information into a processor associated with the dispensing unit, wherein the information includes at least user identification information and wherein the door is unlocked in response to entry of such information;

entering patient identification information into said processor;

opening the door to allow access to the plurality of storage locations;

removing one or more items from one or more storage locations after the door has been unlocked and opened;

manually touching an item switch located adjacent to the storage location from which the item was removed once for each individual item taken;

storing a record of removal for said item with said processor in response to said manually touching said item switch along with said patient identification information that is associated with said item.

2. A method as in claim 1, wherein the processor is located on the dispensing unit.

3. A method as in claim 1, further comprising entering other account identifying information into the processor.

4. A method as in claim 3, wherein both user identification and patient identification must be entered in order to unlock the door.

5. A method as in claim 4, wherein the processor communicates inventory information with a central computer system.

6. A method as in claim 1, wherein the processor totalizes the inventory of items in the storage location each time an item switch is manually touched.

* * * * *